June 3, 1941.  C. E. MASON ET AL  2,244,564
CONTROL
Original Filed July 31, 1935  3 Sheets-Sheet 3
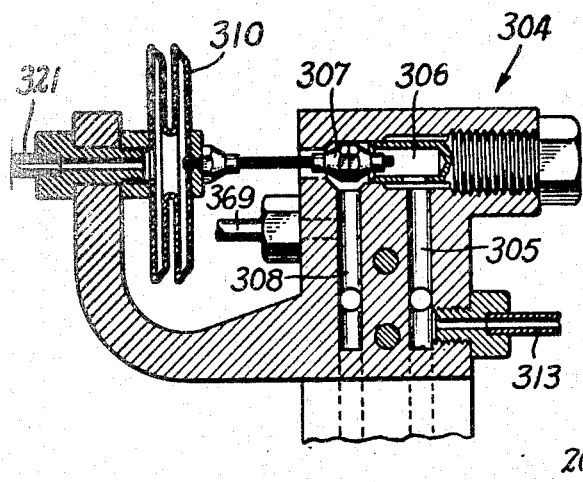
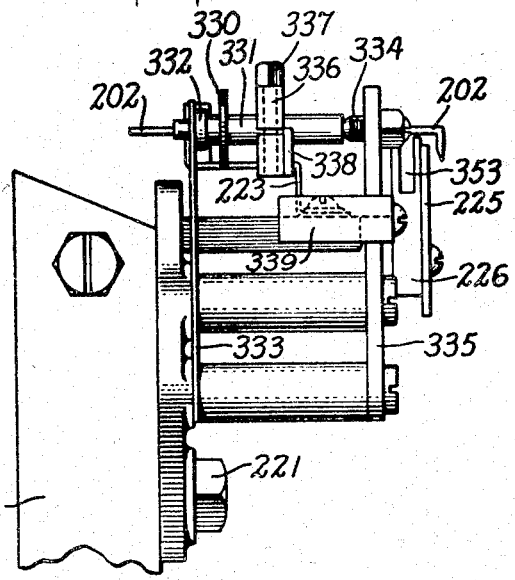
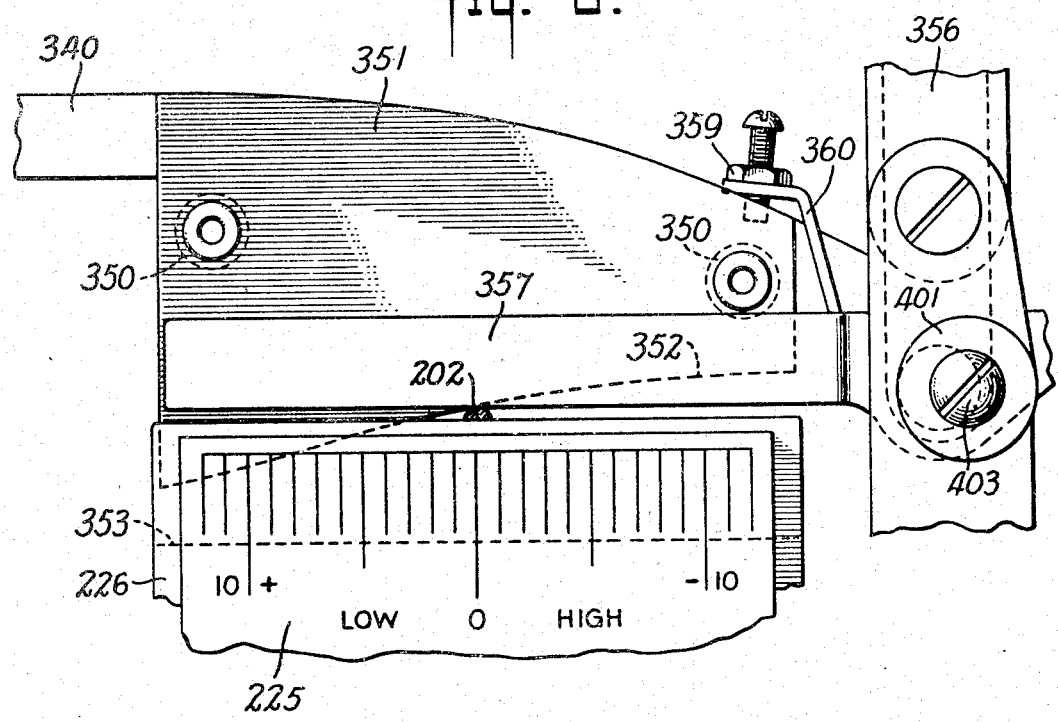
INVENTORS
Cuthbert J. Brown
BY Clesson E. Mason
Blair, Curtis, Dunne & Hayward
ATTORNEYS Patented June 3, 1941

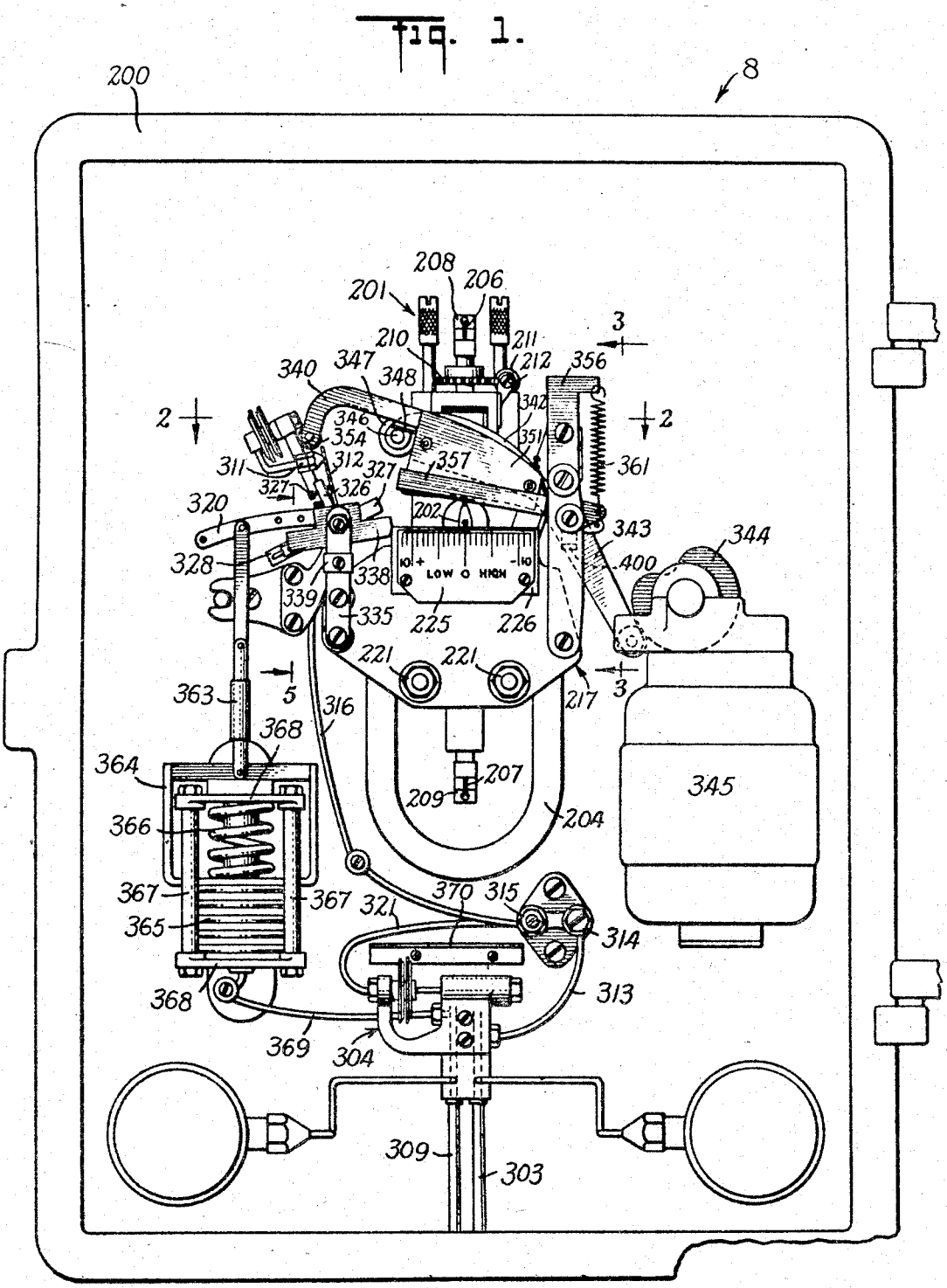

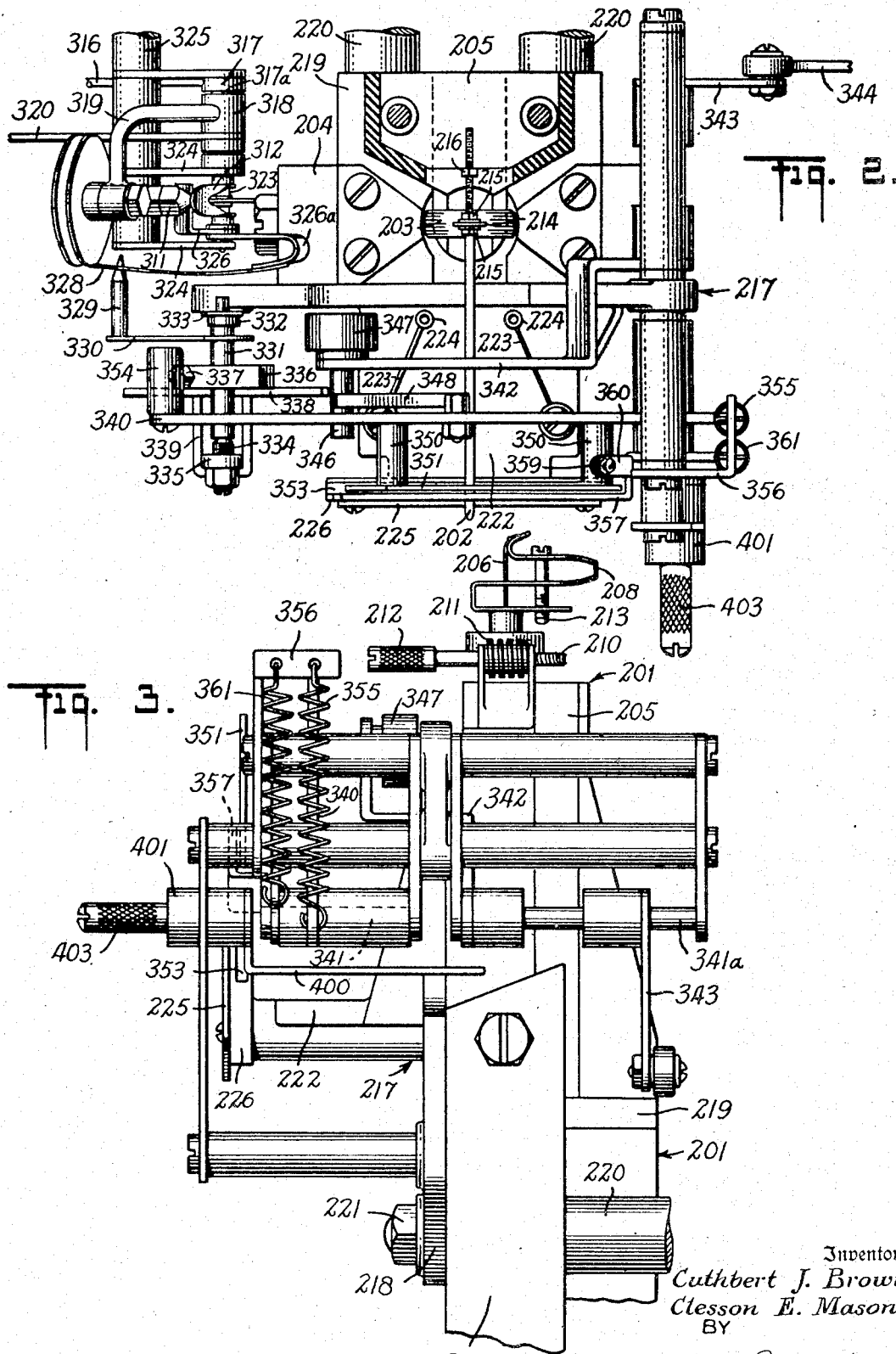

2,244,564

UNITED STATES PATENT OFFICE 2,244,564

CONTROL

Clesson E. Mason and Cuthbert J. Brown, Foxboro, Mass., assignors to The Foxboro Company, Foxboro, Mass., a corporation of Massachusetts Original application July 31, 1935, Serial No. 34,110. Divided and this application June 28, 1939, Serial No. 281,626

6 Claims. (Cl. 137—139)

This invention pertains to control apparatus, and more particularly to apparatus for translating the position of a delicate member, such as a pointer element to a secondary element so that the secondary element is given positions which correspond to those of the delicate member. The secondary element may thus be used to establish corresponding force values, in the present embodiment pneumatic pressure values, which may in turn be used to control valve motors or the like.

In translating apparatus of this type it is desirable to have the apparatus infinitely responsive to the condition being measured. This means that not only should the element which is measuring the value of the condition be this sensitive to the condition, but also the control apparatus which operates in response to the condition-sensitive element should be infinitely responsive to the action of the condition-sensitive element. As an example of this type of apparatus, the condition-sensitive element might be a galvanometer needle which is positioned in response to an electrical circuit such as a thermo couple circuit. In the control instrument, mechanism is used to determine the position of the galvanometer needle and simultaneously to position a secondary element in accordance therewith. The secondary element might be the flapper of the well-known flapper nozzle type of control valve which operating in conjunction with pneumatically operated apparatus establishes an air pressure which may correspond to or be responsive to the position of the galvanometer needle.

It is an object of the present invention to provide improved apparatus for translating the position of a first sensitive element to a second controlling element.

Another object is to provide an improved apparatus for translating the position of a first sensitive element into a pneumatic pressure corresponding to the position of the element.

Another object of the invention is to provide control apparatus wherein lost motion is eliminated so that the control apparatus is responsive to the condition being measured and operates to control the condition in such a way that efficient control operation is obtained.

Other objects will be in part obvious and in part pointed out hereinafter.

This application is a division of my copending application Serial No. 34,110, filed July 31, 1935.

Referring to the several views of the drawings,

Figure 1 is a front elevation of control apparatus mounted in a case and embodying the invention and shows a galvanometer needle and mechanism which translates the galvanometer needle position into a pneumatic air pressure corresponding to the position of the galvanometer needle;

Figure 2 is a section taken on line 2—2 of Figure 1;

Figure 3 is a detailed section taken on line 3—3 of Figure 1;

Figure 4 is a detailed section of a control head valve shown in Figure 1;

Figure 5 is a detailed section taken on line 5—5 of Figure 1; and,

Figure 6 is a detailed section of mechanism which detects the position of the galvanometer needle shown in the center of Figure 6.

Corresponding reference characters refer to corresponding parts throughout the several views of the drawings.

Referring now to Figures 1 and 2, a galvanometer is generally indicated at 201 having a needle or pointer 202. The galvanometer comprises the usual armature 203 mounted between the poles of a magnet 204. The armature is mounted in a Bakelite frame 205 by means of suspension wires 206 and 207 suspended from upper and lower resilient supports 208 and 209 respectively mounted on the Bakelite frame. The upper support 208 is pivotally mounted with respect to the frame and carries a gear 210 meshing with a worm gear 211 which may be turned by means of a knob 212 to adjust the position of rest of the suspension wires and so the neutral or rest position of the armature and needle. The vertical position of the armature is adjustable by means of screw 213 (Figure 3) in support 208. The galvanometer needle 202 is mounted on a strip 214 (Figure 2) (extending from the armature) by lock nuts 215. The needle extends back of the armature and is threaded so that a nut 216 may be adjusted along the needle to balance it. The Bakelite frame 205 is mounted on a frame generally indicated at 217 having a vertical face 218 (Figure 3) and rearwardly extending shelves 219 for supporting the Bakelite frame and the magnet 204. Frame 217 is mounted on the back of the case 200 and spaced therefrom by spacing sleeves 220 and suitable nuts and bolts 221. To limit the pivotal movement of needle 202 a horizontal forwardly projecting shelf 222 of frame 217 has secured thereto supporting wires 223 carrying small porcelain stops 224 between which the needle swings.

An index 225 for use with the needle 202 is supported on the front face of an anvil plate 226 secured by suitable screws to the front of horizontal shelf 222.

The galvanometer may be adjusted so that when it is short-circuited, or when the galvanometer circuit is open, the galvanometer needle will be at or near the center of the scale and so that maximum galvanometer current in one direction deflects the galvanometer to approximately +10 and maximum galvanometer current in the opposite direction deflects the galvanometer to approximately −10.

The galvanometer position is translated by suitable mechanism into pneumatic pressure to operate any suitable device such as a diaphragm motor for example (not shown).

The pneumatic pressure is controlled by the position of the galvanometer by means of the translating mechanism shown in Figures 1, 2, 3 and 4. Gas under pressure from a supplying source (not shown) is conducted through various instrumentalities (not shown) and through tubing 303 to a control head generally indicated at 304 where it passes (Figure 4) through a port 305 to a chamber 306. Chamber 306 contains a double-headed valve 307 and communicates with the atmosphere at its left-hand end. The chamber 306 also communicates with a port 308 as described below. The valve 307 in its extreme right position cuts off communication between 306 and 308 and exhausts port 308 to the atmosphere. In its extreme left position it cuts off passage port 308 from the atmosphere and permits communication with the chamber 306. In intermediate positions it varies the extent of communication of passage 308 with chamber 306 and with the atmosphere and so determines the pressure existing in the port 308. The port 308 may be connected through tubing 309 with any controlling or recording instrument responsive to pneumatic pressure.

Valve 307 is positioned by the pressure existing in bellows 310 and the pressure in the bellows 310 is determined by the relative positions of (referring to Figure 1) a nozzle 311 and a flapper 312 which operate in the well-known manner. The connection between nozzle 311 and the bellows 310 is made as follows: port 305 in the control head is connected by tubing 313 to a reducing tube 314. The reducing tube 314 is connected through a suitable passage to manually operable valve 315. The valve 311 through tubing 316 (Figure 2) is connected to a collar 317 which communicates with a hollow shaft 317a, having a port communicating with a collar 318 on which is mounted by tubing 319 the nozzle 311. The collar 318 also carries a lever 320 to move the nozzle and collar 318 about the shaft. The bellows 310 is connected through tubing 321 to the manually operable valve 315.

Referring to Figures 2 and 5, the flapper 312 is freely mounted on a shaft 323 pivotally supported by arms 324 mounted on a built-up support 325 mounted on the back of case 200. Secured to the shaft is an angle arm 326 carrying an adjustable screw 327 (Figure 1) against which the flapper is urged by a hair spring secured at one end to a sleeve frictionally held on the shaft 323 and at the other end to the flapper. The shaft 323 is coaxial with the axis about which the nozzle is rotated and the hair spring urges the flapper in the direction of the nozzle. Movement of the angle arm toward and away from the nozzle carries the flapper with it but leaves the flapper against the nozzle in the event that the arm moving in a counter-clockwise direction permits the flapper to contact the nozzle.

Extending from the arm 326 is a resilient spring arm 326a, bent on itself and having at its end a slot 328. The flapper and arm 326a is moved by means of a pointed stud 329, the point of which engages the slot 328. The stud is mounted on an arm 330 secured to a shaft 331 frictionally supported between an end thrust bearing 332 mounted on a resilient support 333 and a thrust bearing 334 adjustably mounted on a support 335. By adjusting the position of the bearing 334, the frictional resistance to the movement of shaft 331 may be adjusted. The supports 333 and 335 are mounted on frame 211. Also mounted on the shaft 331 is a split block 336 clamped to the shaft by tightening nut 337. Suitably mounted on the block 336 is a rocker arm 338 by which arm shaft 331, stud 329 and flapper are positioned, the shaft being coaxial with the axis of rotation of the nozzle and flapper. A U-shaped bracket 339, mounted on the support 335 limits the movement of the rocker.

The rocker and flapper are positioned by the galvanometer through a position translating mechanism comprising generally two rocker arms, one of them a detector arm 340 freely pivoted on shaft 341, the other a lifter arm 342, secured to shaft 341a and forming a bell crank with the shaft and a cam follower arm 343 following a cam 344 constantly driven by a motor 345. The lifter arm carries at its free end a stud 346 and a counterweight 347, the stud extending over the rocker arm 338 and under the detector arm 340. On the detector arm is mounted a spring 348 with which stud 346 contacts as the lifter arm is raised under the detector arm.

Extending forwardly from the detector arm are two spacing studs 350, supporting a detector plate 351 having a curved edge 352 (see Figures 1 and 6 dotted lines). The detector edge is positioned over a notch 353 formed in support 226 over which the needle is normally free to swing.

Mounted on the end of the detector arm is a stud 354 which extends over the left end of the rocker bar. As the cam 344 rotates, the cam follower 343 raises and lowers the lifter arm 342. In its raised position the arm 342 contacting with the spring 348 lifts the detector arm 340 free of the needle and free of the rocker bar 338. As the cam continues rotation, the arm 342 lowers and lowers the detector arm 340 until the curved edge 352 of the detector plate 351 contacts the needle and forces it against the top horizontal edges of the supporting plate 226 which stops further movement of the detector arm. Further movement of the cam lowers the arm 342 until the stud 346 contacts with the rocker bar 338 and moves it against stud 354 of the detector arm, in the event that such contact has not already been made during the lowering of the detector arm into contact with the needle. Further movement of the cam raises the lifter arm under the detector arm to lift it out of contact with the needle and the rocker bar. The friction holding shaft 331 is sufficient to hold the rocker bar in place as the lifter arm leaves it but is not so great as to prevent the detector arm from moving the rocker arm as it descends on to the needle or as to prevent the lifter arm moving the rocker bar to correct the position of the rocker bar to the position of the detector arm. In this manner the position of the rocker arm is caused periodically to assume positions corresponding to that of the pointer.

The detector arm 340 is urged in a counter-clockwise direction by means of a spring 355 secured at one end to a bracket 356 suitably mounted on supports extending from frame 217 and the other end in a hole provided in the detector arm.

The edge 352 is preferably curved to obtain a straight line relationship between the position of the needle and the position of the rocker bar. To offset the tendency of such a curved edge to urge the needle to assume inaccurate positions when contacting the needle, a locking arm 357 is provided, freely mounted on shaft 341.

Referring to Figure 6, the locking arm is so pivoted that when its lower edge is in a horizontal position and parallel with the top edges of the anvil or support 226 the edges are spaced apart a distance equal to the thickness of the needle. Consequently as the locking arm descends and locks the needle between it and the anvil, it does not tend to urge the needle to assume incorrect positions.

The locking arm is operated by the detector arm. The locking arm carries an adjustable screw stud 359 mounted on an extension 360 extending from the locking arm. The screw is positioned above one of the spacing studs supporting the detector plate on the detector arm. The locking arm is urged in a downwardly or counter-clockwise direction by means of a spring 361 attached at its upper end to the bracket 356 and to the lower end to the locking arm.

To hold the detector and lifter arms in raised position irrespective of the cam 344, a frictionally mounted L-shaped arm 400 is secured to a supporting frame 401. The arm may be rotated against its frictional resistance by means of a slotted cap 403 projecting forwardly from the mechanism. The arm is adapted to be rotated to contact with the under surfaces of the detector and lifter arms to hold them in raised position.

The period of the position translating mechanism for moving the flapper in accordance with the position of the galvanometer needle may be made as rapid as desired. Some of the factors to be taken into consideration in determining the period of operation of the translating mechanism are the period of the galvanometer and the relationships between the friction of the rocker bar 338 and the masses of the lifter and detector arms effective to move the rocker bar.

The nozzle 311 is caused to follow the position of flapper 312 by means of lever 320 (Figure 2) to which is adjustably connected a resilient link 363 connected at its other end to a rack 364, mounted between a bellows 365 and an opposing spring 366. The bellows and spring are held against one another by spacer sleeves and bolts 367 attached to end plates 368 suitably mounted on the back of the case 200. The bellows 365 through tubing 369 is connected with passage 308 in the control head. As described in the patent to Mason, No. 1,897,135, the nozzle is caused to follow the flapper to maintain the flapper and nozzle in operative relationship, that is, to maintain the nozzle tangent to the flapper. When the flapper moves up to cover the nozzle, maximum back pressure starts building up in the line 316 which tends to cause a decrease of pressure in bellows 365 to move the nozzle away from the flapper. Similarly, when the flapper moves away from the nozzle, pressure in line 316 starts decreasing which tends to cause an increase in pressure in bellows 365 to move the nozzle toward the flapper. The effective relative motion of nozzle and flapper is of the order of .001 of an inch, and hence when the flapper is moved a relatively short distance from the nozzle, the flapper and nozzle are no longer in operative relationship and the pressure in line 316 tends to approach its minimum value. The relative position of the flapper and nozzle within this .001 of an inch range is only approximately proportional to the pressure in the line 316, at any time. However, the net effect of the operations described above is to produce in bellows 365 a mean pressure which is proportional to the position of the flapper. Consequently, for each position of the flapper, a corresponding pressure is set up in the pneumatic pressure responsive controlling or recording instrument and the pressures set up in the instrument correspond with the positions of the galvanometer needle.

A cover plate 370 is provided over the control head 304 to prevent air from the control head from influencing the position of the galvanometer needle.

Accordingly there is provided control apparatus which efficiently and practicably attains the several objects hereinabove set forth.

We claim:

1. Apparatus for translating galvanometer needle position comprising, in combination, a valve including a nozzle and associated flapper mounted for relative movement, a detector arm engageable with said needle for detecting the galvanometer needle position, means for pivoting said arm through an arc the extent of which is determined by the position of the galvanometer needle, a movable bar, means frictionally mounting said bar in the path of said arm for engagement thereby, whereby said bar remains in the position determined by said arm, a lifter arm operated by said first-mentioned means to engage said bar to correct its position to that of said detector arm when the bar underlies the limit of movement of said detector arm, and means connecting said bar and said flapper so that the flapper is positioned in accordance with the position of said needle.

2. Apparatus for translating galvanometer needle position comprising, in combination, a valve including a nozzle and associated flapper mounted for relative movement, a detector plate having a curved edge engageable with said needle for detecting the galvanometer needle position, a detector arm secured to said plate and extending therefrom, means for pivoting said arm and said plate through an arc the extent of which is determined according to the needle position, a rocker bar frictionally mounted in the path of said detector arm for engagement thereby, said curved plate effecting a straight line relationship between the position of said galvanometer needle and the position of said rocker bar, said rocker bar being positioned upon engagement thereof by said detector arm, a lifter arm operated by said first-mentioned means to engage said bar to correct its position to that of said detector arm when the bar underlies the limit of movement of said detector arm, means connecting said rocker bar and said flapper so that the flapper is positioned in accordance with the position of said needle, and a locking arm associated with said detector plate to lock said needle in the position wherein it is engaged by said plate.

3. Apparatus for translating galvanometer needle position into air pressure comprising, in combination, a valve including a nozzle element and associated baffle element, a detector arm for detecting galvanometer needle position for translating the same to one of said elements for relatively positioning one of said elements, an air motor for positioning one of said elements to relatively move them in an opposite sense, a pneumatically operated supply and waste valve for controlling supply of air to and exhaust of air from said motor and operated by the output of said first valve whereby said motor maintains said nozzle and baffle elements tangent to one another, and the pressure in said motor is proportional to the galvanometer position, and means independent of said detector arm for locking said galvanometer needle against movement during the time said detector arm is detecting the position of the galvanometer needle.

4. Apparatus for translating galvanometer needle position into air pressure comprising, in combination, a valve including a nozzle element and associated baffle element, a detector arm for detecting galvanometer needle position for translating the same to one of said elements for relatively positioning one of said elements, an air motor for positioning one of said elements to relatively move them in an opposite sense, a pneumatically operated supply and waste valve for controlling supply of air to and exhaust of air from said motor and operated by the output of said first valve, whereby said motor means maintains said nozzle and baffle elements tangent to one another, the pressure in said motor being proportional to the galvanometer position, a rocker bar frictionally mounted in the path of said detector arm for engagement thereby, said rocker bar being positioned upon engagement thereof by said detector arm, a lifter arm operatively associated with said detector arm and engageable with said rocker bar to correct the position of said bar to that of said detector arm when the bar underlies the limit of movement of said detector arm, and means independent of said detector arm for locking said galvanometer needle against movement during the time said detector arm is detecting the position of the galvanometer needle.

5. Apparatus for translating the position of a galvanometer pointer to a movable member frictionally held comprising, in combination, a detector plate having a curved edge engageable with said pointer for detecting the galvanometer pointer position, a detector arm extending from said detector plate, means for pivoting said arm and said plate through an arc the extent of which is determined according to the galvanometer pointer position, a movable member mounted in the path of said detector arm for engagement thereby whereby said movable member is moved to the position determined by said arm, means operable in conjunction with said detector arm to engage said movable member to correct its position to that of said detector arm when said movable member underlies the limit of movement of said detector arm, and a locking arm associated with said detector plate to lock said pointer in position prior to contact of said pointer by said detector plate.

6. Apparatus for translating the position of a galvanometer pointer to a movable member frictionally held comprising, in combination, a detector plate having a curved edge engageable with said pointer for detecting the galvanometer pointer position, a detector arm extending from said detector plate, means for pivoting said arm and said plate through an arc the extent of which is determined according to the galvanometer pointer position, a movable member mounted in the path of said detector arm for engagement thereby whereby said movable member is moved to the position determined by said arm, means operable in conjunction with said detector arm to engage said movable member to correct its position to that of said detector arm when said movable member underlies the limit of movement of said detector arm, and means biasing said last-mentioned means in the direction of its engagement with said movable member.

CLESSON E. MASON.
CUTHBERT J. BROWN.